United States Patent [19]

Lee

[11] 4,074,694
[45] Feb. 21, 1978

[54] PRESSURE REGULATOR WITH SOFT VALVE SEAT

[75] Inventor: Walter S. Lee, Corona, Calif.

[73] Assignee: Leemco, Inc., Corona, Calif.

[21] Appl. No.: 675,284

[22] Filed: Apr. 9, 1976

[51] Int. Cl.² .............................................. F16K 31/12
[52] U.S. Cl. ........................... 137/505.41; 137/505.38; 251/332; 251/357
[58] Field of Search ................ 137/505.41, 505.42, 137/505.11, 505.12, 505.26, 505.27, 505.28, 505.29, 505.38, 505.39, 505.43, 505; 251/332, 357

[56] References Cited

U.S. PATENT DOCUMENTS

| | | | |
|---|---|---|---|
| 2,731,033 | 1/1956 | Cable | 137/505.42 X |
| 2,904,068 | 9/1959 | St. Clair | 137/505.41 |
| 3,149,828 | 9/1964 | Schutmoat | 137/505.42 X |
| 3,857,407 | 12/1974 | Olson | 137/505.41 |

*Primary Examiner*—Harold W. Weakley
*Attorney, Agent, or Firm*—Harris, Kern, Wallen & Tinsley

[57] ABSTRACT

A pressure regulator with a spring loaded diaphragm having spring pressure and atmospheric pressure on one side and line pressure on the other for moving a valve stem in a valve seat for controlling downstream pressure. A soft seat design utilizing a metal seat in the regulator body and a resilient valve insert carried on the valve stem for engaging the seat. An annular flexible insert carried in an annular groove in the valve stem.

1 Claim, 5 Drawing Figures

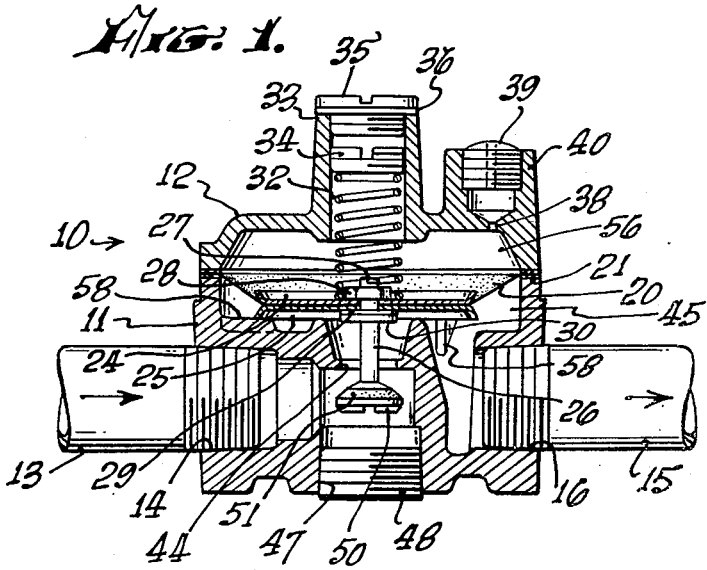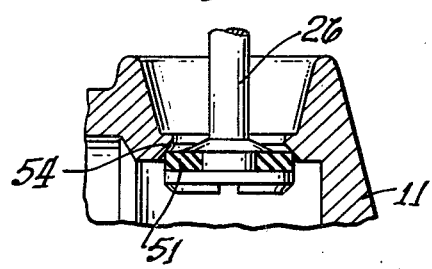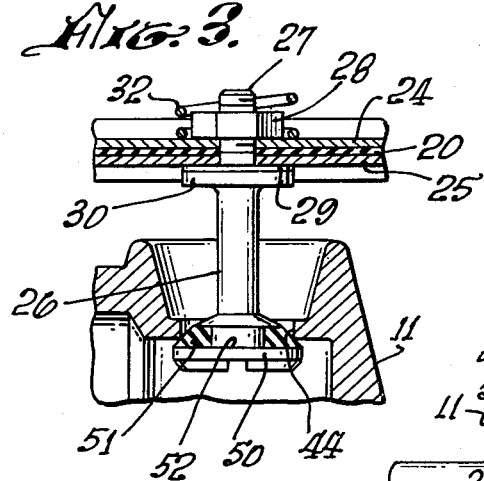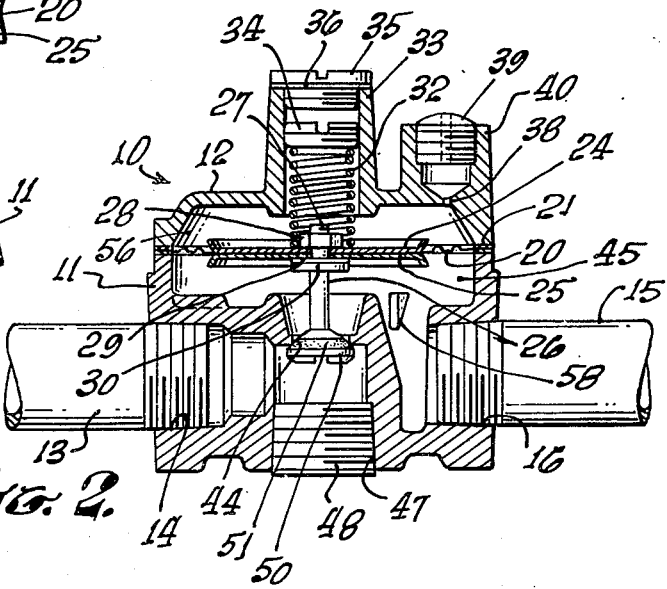

PRESSURE REGULATOR WITH SOFT VALVE SEAT

BACKGROUND OF THE INVENTION

This invention relates to pressure regulators and is especially directed to the small, simple regulator used in conjunction with gas appliances. A typical gas appliance pressure regulator is shown in U.S. Pat. No. 2,979,067.

In this type of regulator, a body, typically a metal casting, provides a gas flow path from an inlet past a valve seat to an outlet. A diaphragm is mounted in the body defining two chambers with a spring and the atmosphere exerting a pressure on one face of a diaphragm and with the gas being controlled exerting a pressure on the opposite face of the diaphragm. A valve stem is carried by the diaphragm and moves a valve member toward and away from the valve seat for controlling gas flow.

In earlier designs, both the valve member and the valve seat were made of metal and both had to be machined to close tolerances to achieve the desired fit. The aforesaid U.S. Pat. discloses a regulator with a soft seat, that is, a grommet of a resilient material such as rubber, mounted in the body for engagement with the moving metallic valve member.

However, this design has certain disadvantages. The grommet has a stressed section for mounting in the body and an unstressed section serving as the seat, and close tolerances are required on both the grommet and the body for proper installation. Also, the valve member carried on the stem has to be pushed through the grommet during installation with the result that the grommet is made sufficiently resilient to receive the entire valve member. With this construction, there is the possibility of the valve member moving into and sticking in the grommet during operation.

It is an object of the present invention to provide a new and improved pressure regulator incorporating a soft seat design while overcoming the disadvantages of the earlier design. A further object is to provide such a regulator with a rigid valve seat in the body and a resilient annular valve insert carried on the stem. A specific object is to provide such a regulator wherein the valve insert may be pushed on to the valve stem, with the valve stem being of a size to prevent passage through the valve seat. Other objects, advantages, features and results will more fully appear in the course of the following description.

SUMMARY OF THE INVENTION

The present invention contemplates a pressure regulator having a body with a valve seat in a gas flow path between an inlet and an outlet, a diaphragm mounted in the body defining first and second chambers, and a valve stem carried on the diaphragm for movement toward and away from the seat. The body with the seat is typically a metal casting, and a resilient annular valve insert is carried on the stem for engagement with the seat. In the preferred embodiment, the valve stem is of unitary construction with an annular groove at the free end, and the valve insert is stretched over a portion of the stem for insertion into the groove.

BRIEF DESCRIPTION OF THE DRAWING

FIG. 1 is a vertical sectional view through a pressure regulator incorporating the presently preferred embodiment of the invention and showing the valve in the open position;

FIG. 2 is a view similar to that of FIG. 1 showing the valve in the closed position;

FIG. 3 is an enlarged partial view of the regulator of FIG. 2;

FIG. 4 is a perspective view of the valve insert; and

FIG. 5 is a view similar to that of FIG. 3 showing an alternative embodiment of the invention.

DESCRIPTION OF THE PREFERRED EMBODIMENTS

The regulator includes a body 10 with housing 11 and cover 12, both typically aluminium castings. An inlet pipe 13 is connected at a threaded opening 14 in the housing, and an outlet pipe 15 is connected at another threaded opening 16. The cover 12 is attached to the housing 14 by screws (not shown), clamping a diaphragm 20 and gasket 21 therebetween.

Upper and lower stiffener plates 24, 25 are clamped to the diaphragm by a valve stem 26 having a threaded upper end 27 projecting through the plates and diaphragm, with a nut 28 and gasket 29 holding the plates and diaphragm against a flange 30 of the stem 26.

A spring 32 is positioned in a boss 33 and urges the diaphragm downward. An adjustment screw 34 is threadedly inserted in a boss 33, and another screw 35 and gasket 36 closes the upper end of the cover. A vent opening 38 is provided in the cover. A screw 39 with an opening therethrough is threadedly inserted in another boss 40 above the vent opening. Screws of various sizes of openings can be used for varying the size of the vent orifice.

There is a gas flow path from the inlet pipe 13 past a valve seat 44 and through chamber 45 below the diaphragm to the outlet pipe 15. In assembling the diaphragm, the valve stem is inserted through an opening 47 at the bottom of the housing 14, the plates and diaphragm are positioned on the upper end of the stem, and fastened in place by the nut 28. The opening 47 is closed with a plug 48.

In the preferred embodiment illustrated, the lower end of the valve stem 26 has a head or valve member 50 of a diameter greater than the opening at the valve seat 44. A resilient annular valve insert 51 is carried on the valve stem, preferably in an annular groove 52 in the head 50. The head 50 could be threaded into the stem 26, but it is preferred to have the head and stem made as one piece, with the insert 51 being stretched over the flange or the head 50 for positioning in the groove 52. In the embodiment illustrated in FIGS. 1–4, the passage at the valve seat is a convention cylindrical passage, with the seat having a substantially square corner. The insert 51 has a truncated conical surface for engaging the valve seat. In the alternative embodiment illustrated in FIG. 5, a conical surface 54 is provided at the valve seat and the insert 51 has a conventional rectangular configuration in cross-section.

The operation of the pressure regulator is conventional. There is a downward force on the diaphragm resulting from the spring 32 and atmospheric pressure in the chamber 56 above the diaphragm. There is an upward force on the diaphragm resulting from gas pressure on the head of the valve stem and in the chamber 45. The relative magnitudes of these forces control the position of the diaphragm and hence the position of the valve insert with respect to the valve seat. The regulator is shown in the full open position in FIG. 1, with the lower plate 25 engaging stop members 58, and is shown in the closed position in FIG. 2, with the valve insert engaging the valve seat. The present design provides the desired soft seat in a simple pressure regulator while at the same time having a very simple valve insert which is easy to manufacture and easy to install and which does not require any close tolerances in machining. Further, the valve insert and head do not move through the passage at the valve seat and there is no chance for sticking in the passage.

The present design permits direct substitution of the valve system with resilient insert for the all metal valve member in existing valves and the interchange of these two types as desired, since the machining in the valve body is the same for both.

I claim:

1. In a pressure regulator having a body with rigid valve seat in a gas flow path between an inlet and an outlet, a diaphragm mounted in said body defining first and second chambers, and a valve stem carried on said diaphragm for movement toward and away from said seat, the improvement comprising in combination:
   a resilient annular valve insert; and
   means for carrying said insert on said valve stem for engagement with said seat, with said stem having a rigid flange with an outside diameter greater than the diameter of the opening of said seat whereby said flange cannot pass through said seat opening and
   with said means for carrying including an annular groove formed integral with said stem, with said insert fitting into said groove and stretched over a portion of said stem for insertion into said groove.

* * * * *